Sept. 9, 1969     E. M. McPHERSON     3,465,671
APPARATUS FOR FABRIC CUTTING
Filed June 16, 1966     3 Sheets-Sheet 1

INVENTOR.
EDWIN M. McPHERSON
BY *Leo Forner*
*Robert J. Dockery*
ATTYS.

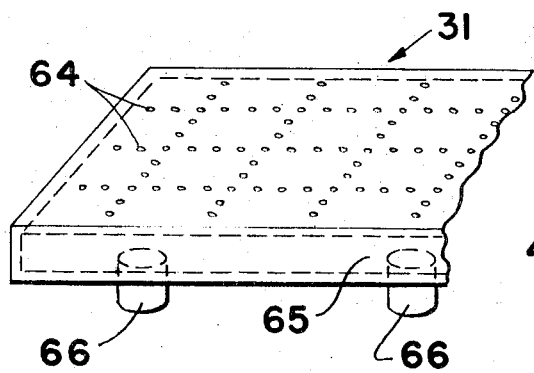
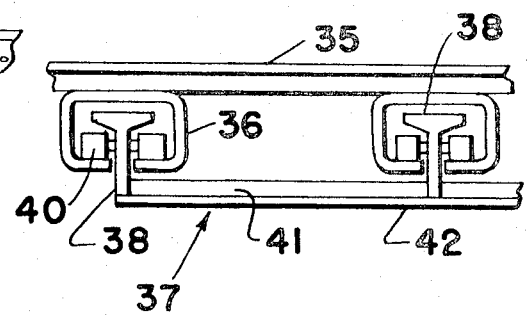
FIG. 4   FIG. 3
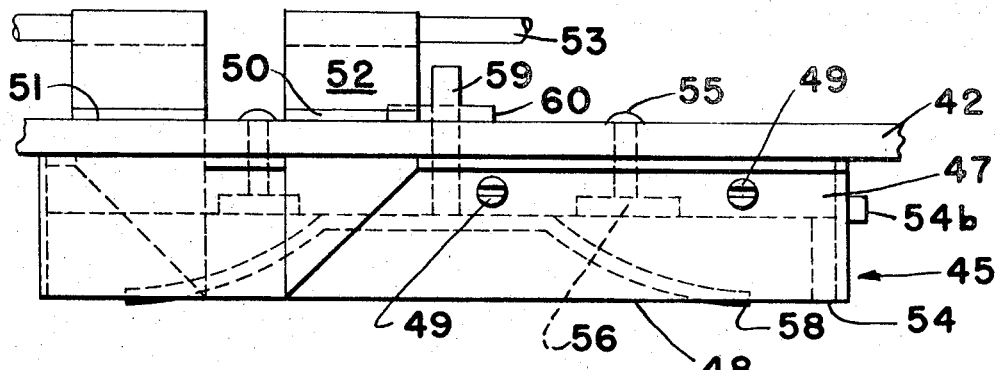
FIG. 5
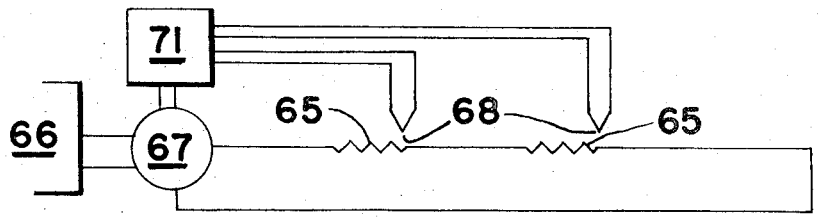
FIG. 6
INVENTOR.
EDWIN M. McPHERSON

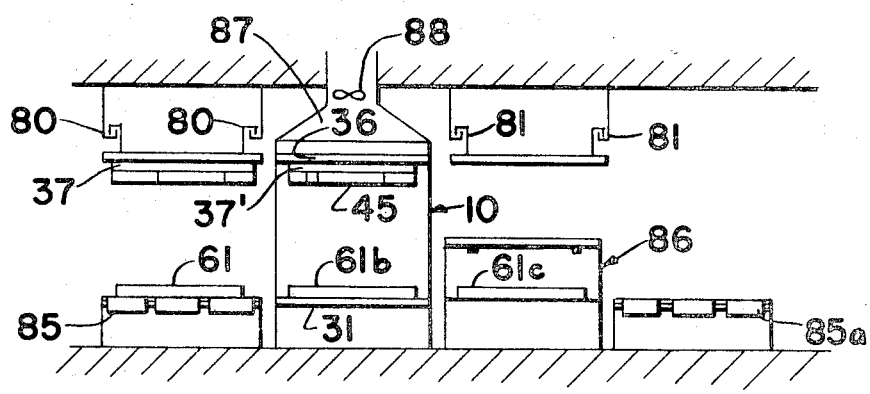
FIG. 8
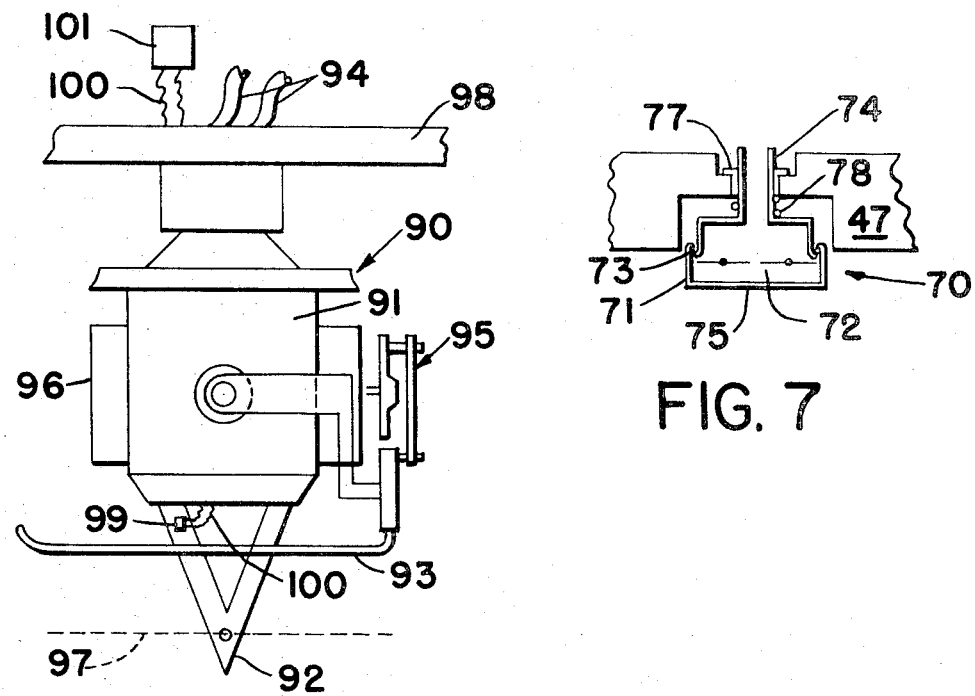
FIG. 7
FIG. 9

United States Patent Office 3,465,671
Patented Sept. 9, 1969

3,465,671
APPARATUS FOR FABRIC CUTTING
Edwin M. McPherson, Baltimore, Md., assignor to J. Schoeneman Incorporated, Owings Mills, Md., a corporation of Delaware
Filed June 16, 1966, Ser. No. 558,076
Int. Cl. B26d 7/10, 5/08
U.S. Cl. 101—114                                        4 Claims

ABSTRACT OF THE DISCLOSURE

The invention involves the heat cutting of fabric into selected shapes and sizes under controlled heat and pressure. The various features of the invention include an improved means of loading, improved notching and marking means, and improved means for the continuous die cutting of the fabric.

---

The present invention relates generally to cutting of fabric. More particularly, the invention relates to an improved apparatus and method for heat cutting of fabric into pieces having selected shapes and sizes.

In the manufacture of clothing, as well as in the manufactuer of various coverings, a need exists for increasing the speed with which pattern pieces can be cut. Cutting methods presently being used are quite time consuming and generally cause substantial loss of yardage due to their inherent limitations. Cutting room costs are a significant part of the cost of manufacturing the finished item. Increased speed and efficiency in the cutting room operation, therefore, involves an important aspect of the manufacturing process. Large amounts of cloth are used by the garment and coverings industries and any means of greater utilization of yardage will allow redemption of a substantial dollar volume of cloth.

It is known in the prior art to utilize a power press, for example, in the cutting of garment patterns. However, these power presses may be problematic for a number of reasons, for example, the various component pieces which form the pattern lay-up must be placed at a great enough distance apart so that compensataion may be made for the tendency of the various plies to bend or "valley" under the downward force of the cutting edge of the die.

It is known also to cut fabric by means of a sharp thin knife. Such knife may either be directed by the hand of a skilled cutter or may be remotely controlled. Cutting by hand is very slow. A remotely controlled knife has a drawback in that the driving motor causes much vibration of the blade. This vibration makes an even and clean cut somewhat difficult to achieve.

One feature of the present invention is that cutting can be accomplished more rapidly than with comparable known methods. Another feature is that the present invention is adaptable to rapid cutting of a wide variety of fabrics and particularly to fabric blends, with less yardage loss than with present methods known to the inventor. Raveling of cut edges is greatly eliminated and, where the fabric contains thermoplastic components, waste is bonded into one piece for easy removal. It is believed that the present invention will be most useful in cutting low-height cloth lays such as are encountered in the making of suits.

For the purposes of this specification, fabric will be used as a term designating textiles, non-wovens and the like, all of which are commonly used in the construction of garments and coverings.

It is an object of this invention to provide an improved apparatus and method for fabric cutting.

Another object is to provide an apparatus and method for rapid cutting of multiple fabric layers.

A further object is to provide a heat cutter for the simultaneous die cutting of fabric into pieces having preselected shapes and sizes.

To accomplish the foregoing and other objects, the present invention provides the features hereinafter described and particularly set out in the claims, the description setting forth in detail certain illustrative embodiments of the invention. These embodiments show some of the many ways in which the principles of this invention may be employed.

For a more complete understanding of the present invention, reference should be made to the drawings wherein:

FIGURE 3 is a detail of a die frame and holding means;

FIGURE 4 is a detail of the base platen shown in FIGURE 1;

FIGURE 5 is a detail of heat cutter die construction;

FIGURE 6 is a wiring diagram in accordance with this invention;

FIGURE 7 is a view of marking means;

FIGURE 8 is a schematic representation of a heat cutting system showing loading means; and FIGURE 9 is a view of a remotely controlled heat knife.

The drawings are to be understood to be more or less of a diagrammatic character for the purposes of illustration. Like characters identify the various elements in the several views.

Figure 1:
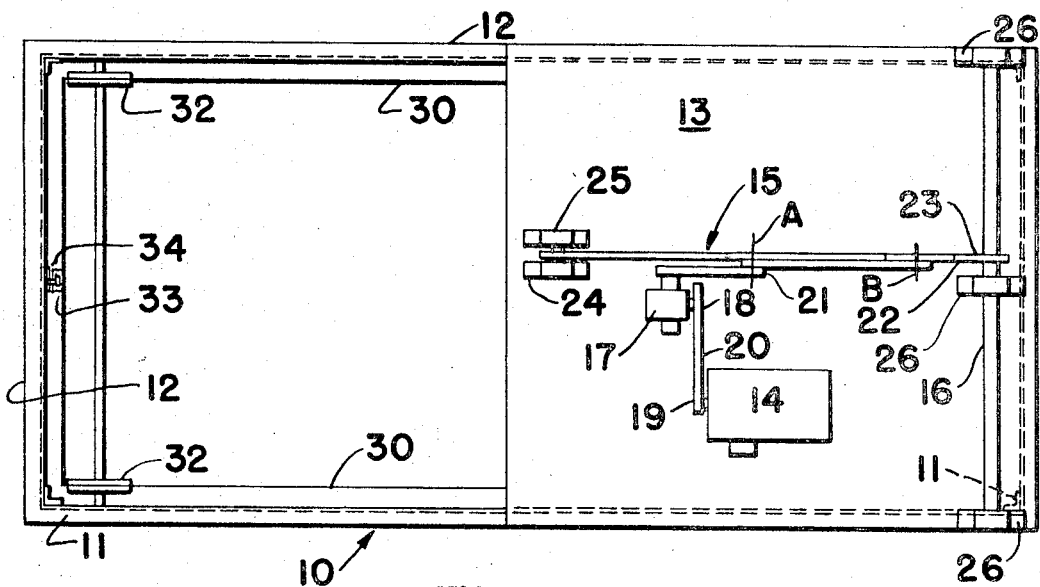
FIGURE 1 is a plan view of a heat cutter constructed in accordance with the principles of this invention.
Figure 2:
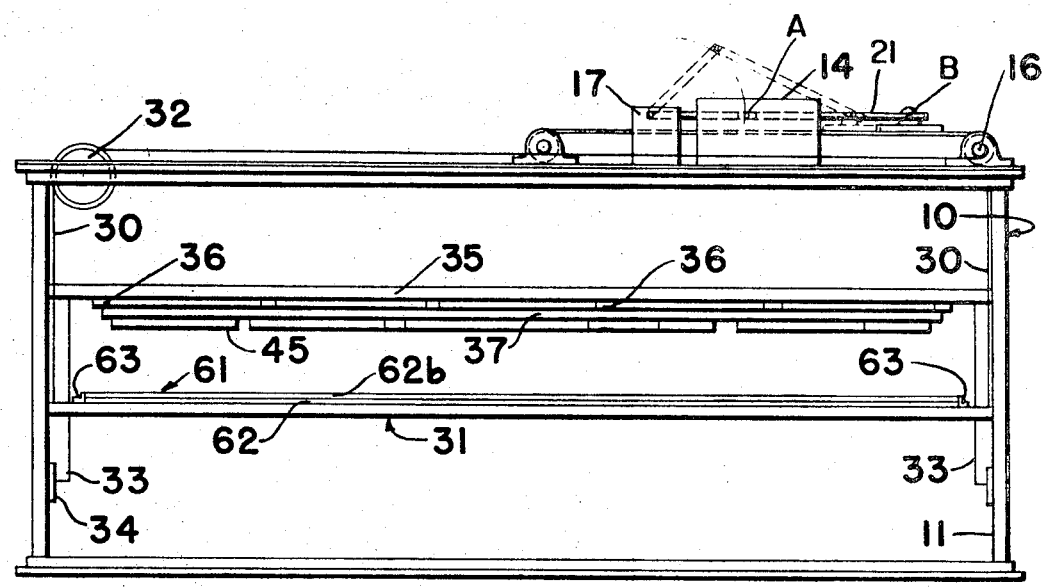
FIGURE 2 is a front elevation of the apparatus of FIGURE 1 including dies installed.

FIGURES 1 and 2 show one embodiment of a heat cutter constructed in accordance with the principles of this invention. In FIGURE 1, a frame designated generally by numeral 10 includes four vertical support members designated as 11 and horizontal members designated as 12. The vertical and horizontal members are 3-inch metal angles. The horizontal members 12 are welded to the vertical supports 11 with one surface of the angle forming a horizontal shelf. A metal plate 13 lays atop the horizontal members 12 and extends about one-half the length of the frame 10. The plate 13 is securely tied to the frame. This plate carries a motor 14, linkages designated generally as 15 and a cable shaft 16.

The motor shown is a two horsepower direct current motor and is linked to a 12½ to 1 speed reducing box 17 by means of pulleys 18 and 19 and a belt 20, the latter which gives a further speed reduction of 3 to 1. A pivoted movement arm 21 is operatively connected to gear box 17. The movement arm is a two-element linkage. Point A on the arm traces an arc as the arm is driven. This motion is translated to horizontal movement of point B. At point B, the arm is operatively attached to a roller chain 22. The chain travels in a closed path, engaging sprockets 23 and 24. Sprocket 24, which is an idler, is rotatably mounted on support means 25. Sprocket 23 is rigidly keyed to the cable shaft 16. Movement of the chain causes corresponding rotation of the cable shaft which is rotatably mounted in three journal blocks designated as 26.

Referring now to FIGURE 2, four cables designated as 30, are wound around the cable shaft 16. Two of the cables extend vertically downward and are fixed at their "free" ends to a base platen 31. The other two cables extend across the top of frame 10 to a set of pulleys 32, wind around the pulleys, and extend vertically downward to the platen 31. These cables are similarly affixed to the platen. It will be apparent that as the cable shaft is driven by the motor 14, the base platen 31 will be raised or lowered depending upon the direction of rotation of the motor. The platen is attached to guides 33 which ride against vertical members 34 located between members 11 at either side of frame 10.

Any number of similar arrangements for movably supporting the base platen can be visualized by one skilled in the art. For example, the arrangement might consist of a windlass driven by an electric motor or of hydraulic lifts located under the base platen.

FIGURE 2 includes a table 61 which is shown resting on base platen 31.

Located beneath the plate 13 is further horizontal framing which will be designated as press frame 35. This framing is stationary and rigidly affixed to the four vertical members 11. Die frame holders designated as 36 run the depth of frame 10 and are attached on the underside of the press frame. FIGURE 2 shows six of these holders spaced along the length of the frame 10. These holders serve to carry a die frame 37. The purpose of the die frame is to support the various individual heat cutter dies designated as 45.

FIGURE 3 is a detail of one type of die frame and shows one means of mounting the die frame to the press frame. The die frame includes a plurality of T channels 38 which ride within the die frame holders 36. The die frame holders are somewhat similar to tracks used on overhead rolling doors. The T channels form the main supports of the die frame. The number of T channels corresponds to the number of die frame holders mounted on press frame 35. Ball bearing wheels 40 are mounted on the supports 38. This construction allows the die frame to be easily rolled into position and makes the frames readily interchangeable. In the shown embodiment, the T channels are laced together with wooden beams 41. Attached to the beams is a flat peg board 42 made of an insulating material. Typically the facing material might consist of a pressed concrete and asbestos board. The thickness of the board may vary, however, a thickness of approximately ¼ inch has been found suitable. Remotely actuated stops (not shown) provide a means for properly positioning the die frame.

Referring now to FIGURE 4, a base platen 31 is perforated with many small holes 64 in its surface. These holes communicate with a plenum chamber 65 within the body of the platen. The plenum chamber is connected to an external source of forced or compressed air through fittings 66. When a table is being loaded or unloaded, air is introduced into the plenum and numerous jets of air at the platen surface allow the table to slide in and out with relative ease. There will be further discussions of the loading and unloading means hereinafter.

FIGURE 5 shows a detail of one form of heat cutter die which is designated generally as 45. The main components are the base sheet 47 and the die cutting blade 48. The base sheet may be, for example, pressed clay and asbestos. The thickness of the base sheet may vary, however, it has been found suitable to cut the base sheet from approximately a ¾ inch thick composition board. The base sheet is cut to the size and shape of the cloth pattern desired. The cutting blade of the die is preferably a thin metal strip. The width of the blade will depend generally on the thickness of the cloth to be cut and may be of any suitable width. A strip ¾ to 1¼ inches wide is believed suitable for most applications. The strip is a resistance strip heater made of an electrical conductor such as, for example, a nickel-chrome alloy. The metal is cut to the proper length and is shaped around the edges of the base sheet 47. Fastening of the metal to the base sheet is accomplished by means of screws 49 typically spaced at approximately 2 inch intervals.

Upright strips of a suitable conducting material 50 and 51 are welded to the die cutting blade 48. The ends of the cutting blade overlap at 51 and are insulated at this overlap by a thin sheet of non-conducting material such as, for example, a ceramic, mica or Pyrex glass. A female element 52, which snaps onto the uprights, is shown in place on the uprights. The element, constructed from a suitable conducting material, forms at its upper end a loop which receives an electrical lead 53. The various lead wires to the individual dies are cut to proper length according to the arrangement of the various dies on the peg board 42. Notching means 54 are welded in place to mark the corresponding points in the seam of the finished work. The notching means comprise typically a piece of metal about .02 inch thick extending approximately ⅛ to ¼ inch in a direction generally normal to the cutting edge on its inner side. The die construction includes a heat sensing means 54b suitably attached to the resistance strip 48.

A typical die cutting resistance strip might be 80% nickel and 20% chromium alloy, with a thickness of about .02 inch and exhibiting a 100,000 to 200,000 pound tensile range. This alloy would typically be non-magnetic. The resistance cutting strip would typically have a linear expansion factor of approximately .0001% maximum.

Means are incorporated into the die construction for attaching individual dies to the peg board. The figure shows a bolt 55 screwed to a nut 56. A portion of the base sheet is cut away to receive the nut. The figure also shows an example of an alternate die fastening means incorporating in the fastening means a leaf spring 58 which serves to expel the material from the die after the cut is completed. This fastening means might be used singly or in combination or with other fastening means such as the bolt 55. The leaf spring 58 is attached at one end to a pin 59. The pin carries a key 60 near its other end. The pin serves to secure the die to the peg board, the pin extending up through the board when the die is in place. The spring prevents the fabric from sticking in the dies after a cut has been made and assures that the fabric will be uniformly expelled from each of the dies as might not be the case if simply gravity were relied upon for the expelling.

Referring again to FIGURE 2, table 61 is shown resting on base platen 31. The table is typically constructed of a rigid metal and composition board frame 62, surfaced with a ¼ inch thick sheet of pressed glass fiber 62b. A variety of materials might be used to surface the table, however, the pressed glass fiber sheet has been effectively utilized. In the cutting operation, the fabric is first spread onto the table and the table is then loaded into the cutting machine. Stops 63 serve to guide the table and hold it from movement once the table has been placed in position on the base platen. FIGURE 2 shows the base platen 31 in a loading position which allows about 6 inches for placing the table 61 onto the platen. The arrangement may also allow for the base platen to be lowered approximately another 6 inches to provide ease of loading and unloading of the die frame 37. When both dies and fabric are in position, the motor 14 is actuated and the base platen 31 is motivated upward toward the die cutting edges. The movement is slow compared with the action of cold die power presses which rely entirely on force to achieve the cut. In the present invention, the cut is produced by the combined action of controlled heat and pressure. Means are provided for bringing electrical energy to the dies and also for controlling the heat in the heat cutter dies.

FIGURE 6 shows a schematic electrical wiring diagram for the cutter described above. Resistances 65 represent the various individual die cutting blades. Power is supplied to the dies from a suitable source 66 through a variable voltage transformer 67. Heat sensors, designated as 68, typically placed on the surface of the die cutting blades, serve to allow control of the temperature at which the die cutting operation is carried out. Various methods can be used to accomplish control of heat of the die. Control is necessary because the die loses heat as a cut is being made. The controlling means must be capable of rapidly bringing the temperature of the die cutting blade back to the desired setting. A suitable control system might typically consist of a thermocouple heat sensor welded to the resistance strip of the individual die and attached through a controller 71 to a variable voltage transformer 67. The thermocouples 68 would be monitored by controller 71 which might typically sample one or more of the die blade temperatures and increase or decrease the voltage accordingly. A variety of suitable controllers are available commercially.

FIGURE 7 is a cross-sectional view of a marking means. The marking means may form an integral part of the die cutter. It allows the individual pieces of the pattern to be readily marked for identification at a later time. The marking means shown comprises a box 70 which is filled with finely ground chalk (not shown). The lower portion of the box 71 is movable in relation to the upper portion 74. A butterfly valve 72 is actuated by a lip 73 on the upper portion of the box when the movable lower portion is pushed upward. The opening of the butterfly valve causes a release of some of the chalk from the upper portion of the box. The chalk is, in turn, released through the holes 75 in the bottom of the box. Generally the holes in the box would form numbers or letters. The marking means is carried in the die base 47 and, as the cut is made, the cloth is pushed up against the bottom of the marking box. The chalk released through the butterfly valve falls on the cloth. The marking means is held by collar 77 and spring 78. The spring allows the box to bear against the cloth with a slight pressure to assure an even transfer of the chalk. This marking means allows each of the individual cuts to be marked with a particular number, letter or other designation which expedites later handling of the various pieces. Similar marking means may be used to mark buttonholes, pocket points, etc. An alternate marking means might consist of a piece of tailor's chalk springably mounted which would mark the cloth as it was urged up against the chalk.

FIGURE 8 shows, in schematic representation, a means of loading and unloading the cutting tables and die frames. Referring specifically to FIGURE 8, a die frame 37 is suspended on overhead conveying rails 80. The rails carry the frame to a point just opposite the heat cutter frame 10. From this position the frame 37 is pushed toward die frame holders 36 mounted in frame 10. A variety of means might be used for moving the die frame into frame 10, for example, an air cylinder ram. The die frame is carried on the conveyor rails in such a way that it can move toward the frame 10 once properly positioned opposite the respective die frame holders.

As the die frame 37 is urged into frame 10, the die frame 37', already in place, is pushed out and onto rails 81 whereupon it is then transported to a storage area.

The cutting table 61 is loaded and unloaded in a manner somewhat similar to the means described in reference to the die frame. The cutting table is transported to a point opposite the heat cutter frame 10 on a first roller conveyor 85. The table is pushed into place by suitable means so that it rests on base platen 31 beneath the die cutting blades 45. As one table is moved into place, the table already in place 61b is moved into a conditioning area 86, where moisture is added to the cloth and where odors are removed. The table 61c which is already in the conditioning area is, in turn, pushed out onto a second roller conveyor 85a and thereupon the cloth is separated from the waste and the table moved along so that fabric again may be laid upon it. Once spreading of the new fabric is done, the table will move to the first roller conveyor and will again enter the die cutter.

A hood 87 is shown with an exhaust fan 88. The hood is mounted on frame 10 above the heat cutter dies and assists in maintaining proper temperature in the cutting dies. Air which is exhausted through holes in the base platen to assist in loading and unloading is drawn up past the various dies and out through the exhaust hood. It can be seen that the air jets may serve a two-fold purpose, namely assisting in the placement of the table and assisting in carrying off the heat and odors generated by the heated dies. Where the air is recirculated filters should be used, e.g. charcoal granules.

A number of suits have been prepared suing a heat die cutter according to the principles of this invention. The die cutter was constructed generally of the materials and in the fashion shown previously herein and was used to cut several different types of cloth. Examples of the temperature of dies and corresponding times are shown in the table below:

| Temperature, degrees centigrade | Time in seconds | Cloth |
| --- | --- | --- |
| 300 | 1.5 | 55% Dacron, 45% wool. |
| 350 | 3.0 | 40% Dacron, 35% wool; 25% mohair. |
| 400 | 3.0 | 100% wool. |
| 050 | 1.5 | 100% silk. |

These times represent times to cut two layers of cloth. More layers do not require appreciably more time, for example, six layers of the 55% dacron, 45% wool sample in the table shown above were cut in 1.6 seconds using a die temperature of 305° C. It is anticipated that heights of up to about one inch may be cut, representing typically in the neighborhood of twenty plies of some types of cloth.

One of the features of this invention has been herein described as the novel cutting method to cut with less loss of yardage than with present methods. In the embodiment shown in the foregoing figures, this benefit comes about through the use of lower pressures than are needed with cold dies. Cold dies operating under tremendous pressures force the cutting blade through the fabric layers. Since the fabric, as a rule, is not a rigid mass there is a tendency of the various plies in the area directly beneath the cutting blade to distend prior to being severed by the blade. As a result, the fabric is not cut as it lies flat, but rather the cut in each ply is slightly different, the bottom-most plies being backed by the rigid top of the cutting table. The present inventor has calculated that by cutting low heights rapidly the time required for cutting is substantially reduced over current accepted practice. This approach has a two-fold benefit. The present ply allowances to offset goods bowed at selvage, ranging from about ½ inch to two inches per garment is eliminated. This represents an appreciable cost saving. Further, the heat cutter has an advantage over cold dies in that the cold dies lose about ½ to 1½ inches between the various individual pattern pieces depending upon the height of the plies.

FIGURE 9 illustrates an alternative embodiment of an apparatus constructed in accordance with the principles of the present invention. Referring to FIGURE 9, a remotely controlled heat knife is designated generally as 90. The knife includes a body portion 91, a blade 92, and a patter plate 93. The blade is of a thin electrical conducting material and is generally V-shaped. Cutting is accomplished generally at the base of the V. The two upper legs of the V are connected to wire leads 94 shown protruding from the top of the apparatus. Suitable insulation is provided between the blade and the rest of the apparatus. The patter plate is driven up and down through suitable means shown in the figure as a cam arrangement and designated generally as 95. The motor 96 serves as the prime mover for the pattern plate and is operatively connected to the cam system. The patter plate is important since the heated blade has to effectively force its way through the cloth as it makes the cut. The forward edge of the blade may be sharpened to an extent to assist it in its movement through the cloth. The placement of the fabric is indicated by phantom line 97. The remote cutting knife is suspended from some suitable apparatus which is schematically indicated in the drawing as bar 98. The leads 94 are connected to a suitable electrical source (not shown).

Where the fabric has thermoplastic constituents, the cut achieved by such a remotely controlled heat knife has the advantage of bonding various layers of fabric as the cut is made so that separation of the waste from the pattern pieces is easy to do. Furthermore, since there is no vibration as is associated with a cutting knife having a reciprocating blade, the cut is finer and more even through the various plies than can be accomplished with a reciprocating blade. As in the case of the die cutter embodiment, there is a resultant savings in cloth used.

As in the case of the heated die cutter, it is important in the heat knife to be able to control the temperature of the cutting blade. A temperature sensing device 99 is shown connected through leads 100 to a controller 101. For the way in which a suitable control may be achieved reference is made to FIGURE 6. The resistances shown in FIGURE 6, would for the case of the heat knife represent the blade 92. Failure to maintain temperature control may result in burning or scorching of the fabric.

In addition to the above, it will be appreciated that certain principles of the instant invention may be utilized in similar cutting tools, for example, in apparatus for cutting of piece goods into strips as the goods are laid on the cutting table.

Although the present invention has been described with reference to specific apparatus, it will be appreciated by a person who is skilled in the art that a wide variety of changes may be made without departing from the spirit and scope of this invention. For example, certain features of the apparatus may be used independently of others and equivalents may be substituted for the various apparatus and method steps, all within the intended spirit and scope of the invention as defined in the appended claims.

I claim:

1. An apparatus for the simultaneous die cutting of fabric into pieces having selected shapes and sizes comprising in combination: means for supporting aligned layers of the fabric; a frame; a plurality of individual dies carried by the frame, each of said dies comprising a base sheet formed to the size and shape of the pieces to be cut, an electrically conductive die cutting blade, said blade being a thin conductive strip attached securely to the base sheet about the outer edge of the sheet and extending out from the surface of the sheet a distance corresponding generally to the thickness of fabric to be cut, said die cutting blades being aligned with respect to the supporting means in a plane generally parallel to the supporting means; means for heating the blades including inlet electrical means at one end of said strip and electrical outlet means at the opposite end of said strip and means for insulating electrically the respective ends; means for controlling the temperature of said die cutting blades; and means for moving said frame and said supporting means toward and away from each other, whereby the die cutting blades are urged through the fabric by action of heat and pressure.

2. The apparatus of claim 1 including means for sensing the temperature of said conductive strip.

3. The apparatus of claim 2 including notching means electrically connected to said conductive strip.

4. An apparatus for the simultaneous die cutting of fabric into pieces having selected shapes and sizes comprising in combination: means for supporting aligned layers of the fabric; a frame; electrically conductive die cutting blades carried by the frame and positioned in the shape of the desired cut to form individual dies, said die cutting blades being aligned with respect to the supporting means in a plane generally parallel to the supporting means; means connected to said blades for heating the blades; means for controlling the temperature of the die cutting blades; means for moving said frame and said supporting means toward and away from each other; and means for marking the cut pieces for later processing, said means being aligned in substantially the plane of the cutting blades and said means including a powder holding box including an upper portion and a lower portion; a butterfly valve forming the bottom of said upper portion, said lower portion located below the valve and having a stenciled hole in the bottom thereof and means for opening the butterfly valve whereby powder is released through the stenciled hole.

References Cited

UNITED STATES PATENTS

| | | | |
|---|---|---|---|
| 1,449,445 | 3/1923 | Rand | 83—171 |
| 1,890,192 | 12/1932 | Pfeiffer | 101—114 |
| 1,894,530 | 1/1933 | Bernardo | 101—114 |
| 1,992,250 | 2/1935 | Stacey | 83—171 X |
| 2,247,444 | 7/1941 | Lindholm | 83—143 X |
| 2,437,295 | 3/1948 | Eastwood | 83—171 |

FOREIGN PATENTS

| | | |
|---|---|---|
| 647,276 | 12/1950 | Great Britain. |
| 756,447 | 9/1956 | Great Britain. |

FRANK T. YOST, Primary Examiner

U.S. Cl. X.R.

83—171, 620, 632, 635